US006156680A

United States Patent [19]
Goettmann

[11] Patent Number: 6,156,680
[45] Date of Patent: *Dec. 5, 2000

[54] REVERSE OSMOSIS SUPPORT SUBSTRATE AND METHOD FOR ITS MANUFACTURE

[75] Inventor: James A. Goettmann, North East, Pa.

[73] Assignee: BBA Nonwovens Simpsonville, Inc., Simpsonville, S.C.

[ * ] Notice: This patent is subject to a terminal disclaimer.

[21] Appl. No.: 09/220,492

[22] Filed: Dec. 23, 1998

[51] Int. Cl.$^{7}$ .............................. D04H 1/00; D04H 13/00

[52] U.S. Cl. .......................... 442/344; 442/351; 442/361; 442/364

[58] Field of Search .............................. 162/157.3, 157.5, 162/146, 205, 206; 210/500.21; 264/41; 442/344, 351, 361, 364

[56] References Cited

U.S. PATENT DOCUMENTS

| | | | |
|---|---|---|---|
| 3,114,670 | 12/1963 | Iwasaki | 162/146 |
| 3,731,815 | 5/1973 | Collingwood et al. | 210/496 |
| 3,743,570 | 7/1973 | Yang | 162/157.5 |
| 3,762,564 | 10/1973 | Weedon et al. | 210/446 |
| 3,891,499 | 6/1975 | Kato et al. | 162/157 |
| 3,902,957 | 9/1975 | Kozlowski | 162/157 |
| 4,007,083 | 2/1977 | Ring et al. | 162/101 |
| 4,454,176 | 6/1984 | Buckfelder et al. | 427/246 |
| 4,496,583 | 1/1985 | Yamamoto et al. | 428/288 |
| 4,529,481 | 7/1985 | Yoshida et al. | 162/157.3 |
| 4,618,401 | 10/1986 | Bodendorf | 162/138 |
| 4,710,432 | 12/1987 | Nishimura et al. | 428/542.8 |
| 4,728,394 | 3/1988 | Shinjou et al. | 162/129 |
| 4,795,559 | 1/1989 | Shinjou et al. | 210/490 |
| 4,859,384 | 8/1989 | Fibiger et al. | 264/45.1 |
| 4,904,520 | 2/1990 | Dumas et al. | 428/212 |
| 4,904,523 | 2/1990 | Kampf et al. | 428/288 |
| 4,973,382 | 11/1990 | Kinn et al. | 162/146 |
| 4,988,560 | 1/1991 | Meyer et al. | 428/297 |
| 4,990,248 | 2/1991 | Brown et al. | 210/136 |
| 5,019,264 | 5/1991 | Arthhur | 210/500.37 |
| 5,028,329 | 7/1991 | Drioli et al. | 210/490 |
| 5,057,357 | 10/1991 | Winebarger | 428/195 |
| 5,133,835 | 7/1992 | Goettmann et al. | 162/146 |
| 5,137,606 | 8/1992 | Arthur | 203/57 |
| 5,141,699 | 8/1992 | Meyer et al. | 264/518 |
| 5,167,765 | 12/1992 | Nielsen et al. | 162/146 |
| 5,167,794 | 12/1992 | Nielsen et al. | 162/146 |
| 5,207,916 | 5/1993 | Goheen et al. | 210/637 |
| 5,225,242 | 7/1993 | Frankosky et al. | 427/209 |
| 5,232,770 | 8/1993 | Joseph | 428/284 |
| 5,275,725 | 1/1994 | Ishii et al. | 210/321.67 |
| 5,288,348 | 2/1994 | Modrak | 156/62.2 |
| 5,290,502 | 3/1994 | Jeffery et al. | 264/324 |
| 5,307,796 | 5/1994 | Kronzer et al. | 128/206.16 |
| 5,328,758 | 7/1994 | Markell et al. | 428/281 |
| 5,380,582 | 1/1995 | Neely, Jr. et al. | 428/220 |
| 5,403,444 | 4/1995 | Goettmann et al. | 162/146 |
| 5,413,849 | 5/1995 | Austin et al. | 428/293 |
| 5,415,738 | 5/1995 | Mehta et al. | 162/146 |
| 5,415,779 | 5/1995 | Markell et al. | 210/635 |
| 5,456,836 | 10/1995 | Jeffery et al. | 210/505 |
| 5,470,640 | 11/1995 | Modrak | 428/171 |
| 5,486,410 | 1/1996 | Greoger et al. | 428/283 |
| 5,491,016 | 2/1996 | Kaiser et al. | 428/198 |
| 5,492,580 | 2/1996 | Frank | 156/72 |
| 5,492,627 | 2/1996 | Hagen et al. | 210/651 |
| 5,496,603 | 3/1996 | Riedel et al. | 428/40 |
| 5,527,600 | 6/1996 | Frankosky et al. | 428/286 |
| 5,529,686 | 6/1996 | Hagen et al. | 210/198 |
| 5,534,340 | 7/1996 | Gupta | 428/286 |
| 5,558,771 | 9/1996 | Hagen et al. | 210/500.25 |
| 5,593,738 | 1/1997 | Ihm et al. | 427/534 |
| 5,851,355 | 12/1998 | Goettmann | 162/157.3 |
| 5,935,884 | 8/1999 | Williams et al. | 442/364 |

*Primary Examiner*—Blaine Copenheaver
*Assistant Examiner*—Christopher C. Pratt
*Attorney, Agent, or Firm*—Ostranger Chong & Flaherty LLP

[57] ABSTRACT

A nonwoven composite web is formed by a wet process on a papermaking machine. The web coming off the papermaking machine is dried and thermally bonded using heated calendar rolls. The nonwoven composite material is made from a furnish of polymeric staple fibers, a first binder fiber consisting, at least in part, of a first thermoplastic binder material which melts at a first melting temperature less than and a second binder fiber consisting, at least in part, of a second polymeric material which has second melting temperature which is higher than the first melting temperature. The first polymeric material is selected to have a first melting temperature less than the temperature to which the first material will be subjected in the papermaking machine. The melted first polymeric material gives the web strength on the papermaking machine. The second polymeric material is selected to have a second melting temperature less than the temperature to which the second material will be subjected in the calendar rolls. Thus, the second polymeric material is melted as the web passes through the calendar rolls and thermally bonds the other fibers of the web when the melted second polymeric material fuses upon cooling. The staple fibers are made of polyester and the bicomponent binder fibers are of the co-polyester/polyester sheath/core variety. The support substrate has a sheet porosity in the range of 5–10 cfm.

11 Claims, 3 Drawing Sheets

REVERSE OSMOSIS SUPPORT SUBSTRATE AND METHOD FOR ITS MANUFACTURE

FIELD OF THE INVENTION

This invention generally relates to synthetic nonwoven materials fabricated by wet-laid processes. In particular, the invention relates to a paper-like web made with polyester fibers which is useful as a support substrate for a reverse osmosis membrane.

BACKGROUND OF THE INVENTION

Reverse osmosis is a process for purification of saline water. In accordance with this process, a pressure in excess of the osmotic pressure of the saline water feed solution is applied to the feed solution to separate purified water using a semipermeable membrane. Purified water diffuses through the membrane while salts and other impurities are retained by the membrane.

The mechanical properties of the membranes often require reinforcement or support, for example, with polyester woven or nonwoven fabric, in order to prepare satisfactory reverse osmosis structures. Typically, a reverse osmosis membrane is formed by coating or casting an appropriate polymer (e.g., polysulfone) solution onto the supporting fabric. With the coating of extremely thin membranes, continuity of the membrane on the supporting surface is difficult to obtain. Moreover, the lack of proper adhesion between the supporting fabric and the reverse osmosis membrane can lead to delamination in use, which results in the formation of blisters between the supporting fabric and the reverse osmosis membrane.

Fabrics used as a support substrate in reverse osmosis applications are preferably low in cost, stable under the operating conditions encountered in reverse osmosis operations and highly porous so as to retain high flux in operation.

A support material disclosed in U.S. Pat. No. 4,454,176 to Buckfelder is prepared by weaving a yarn of polyester. The woven cloth is dried, heat set and calendared, and used as the reverse osmosis membrane substrate. Other support fabrics used by Buckfelder to make exemplary supported reverse osmosis membranes include a calendared spunbonded polyester fabric and a resin-bonded polyester fabric.

U.S. Pat. No. 4,728,394 to Shinjou discloses a semipermeable membrane support of the type which is used for precise filtrations such as in ultrafiltration and reverse osmosis. Such precise filtration is utilized in desalination of seawater, the food industry, treatment of industrial wastewater and medical applications. The Shinjou '394 patent discloses that semipermeable membranes comprising synthetic polymer, without any support, are inferior in mechanical strength. Therefore such membranes are generally used with a backing material such as woven fabric. For example, reverse osmosis membranes are formed by casting a polymer solution directly onto a porous support such as a nonwoven fabric. Conventional membrane support substrates include woven and knitted fabrics, nonwoven fabric, porous sintered material, or paper.

In particular, various support substrates which use nonwoven fabric have been developed. However, supports having a high density cause insufficient penetration of the polymer solution. A consequence is the delamination between layers due to reduced peeling strength between the support and membrane. Another consequence can be the generation of pinholes due to residual bubbles, because of insufficient debubbling in the support. Low-density support substrates, in spite of sufficient penetration by the polymer solution, result in over penetration of the polymer solution to the back surface opposite to the casted surface. The resulting membranes give uneven filtration. Severe defects such as reduced filtration performance and/or damage of the semipermeable membrane due to the partial excessive pressurization during filtration operation can result.

The Shinjou '394 patent proposes to solve the foregoing problems by forming a low-density nonwoven layer to a high-density nonwoven layer and laminating the layers using a heated calendar. Then a polymer solution is cast on the low-density layer of the laminated support. The low-density nonwoven layer is formed by a dry process and the high-density nonwoven layer is formed by a wet process. All of the fibers in both layers are polyester. The dry-processed polyester nonwoven layer comprises 20–80%. preferably 30–60%, binder fibers, which encompasses both undrawn polyester fibers and conjugate (i.e., bicomponent) polyester fibers. The wet-processed nonwoven layer is formed entirely of polyester fibers having a denier of 1.5 or less, comprising 30–90%, preferably 40–70%, undrawn or conjugate polyester fibers. The wet process is a conventional papermaking process followed by heated calendaring. In the examples of Shinjou, the wet-processed nonwoven consisted of 50% polyester staple fibers having a denier of 1.0 and a length of 5 mm and 50% of undrawn polyester fibers having a denier of 1.0 and a length of 5 mm.

The foregoing prior art does not disclose a non-woven support substrate made by a wet process on a papermaking machine without lamination to a dry-processed nonwoven web.

SUMMARY OF THE INVENTION

The present invention is a nonwoven support substrate which is formed by a wet process on a papermaking machine without lamination to a dry-processed nonwoven web. The web coming off the papermaking machine is dried and thermally bonded using heated calendar rolls. This invention has the benefit of eliminating the manufacturing costs associated with dry web formation.

The nonwoven support substrate in accordance with the preferred embodiment of the invention is a composite material comprising polymeric staple fibers, a first binder fiber consisting, at least in part, of a first thermoplastic binder material which melts at a first melting temperature less than the melting temperature of the polymeric staple fibers, and a second binder fiber consisting, at least in part, of a second thermoplastic binder material which melts at a second melting temperature less than the first melting temperature. The first thermoplastic binder material is selected to melt at the temperature which it is exposed to in the calendar during thermal bonding. The second thermoplastic binder material is selected to melt at the temperature which it is exposed to in the papermaking machine. The melted second thermoplastic binder material gives the web strength on the papermaking machine.

In accordance with the preferred embodiment of the fiber furnish, the staple fibers are made of polyester and the bicomponent binder fibers are of the sheath/core variety. The lower-melting-point bicomponent binder fiber has a co-polyester sheath and a polyester core. The co-polyester sheath melts at a temperature of 225° F. The higher-melting-point bicomponent binder fiber also has a co-polyester sheath and a polyester core, but the co-polyester sheath melts at a temperature of 375° F.

An important feature of a membrane support substrate is its sheet porosity. For example, in the case where the polymer cast onto the support substrate is polysulfone, if the sheet porosity is too low, the polysulfone will not attach to the support substrate. On the other hand, if the sheet porosity is too high, the polysulfone penetrates the support substrate too much and does not form a film on the surface. In accordance with the present invention, the fiber deniers and lengths are selected to achieve a sheet porosity in the range of 5–10 cfm. In accordance with the present invention, this is achieved by using polyester staple fibers having a denier in the range of 0.2 to 3.0.

Alternatively, the binder fiber contains thermoplastic material having a melting temperature different than that of the polyester staple fibers, but the binder fiber need not be bicomponent. The thermoplastic material of such binder fibers can be a polymer different than polyester, e.g., polyethylene, or a polyester having a molecular weight which is different than the molecular weight of the polyester staple fibers.

The component fibers are combined with water into a homogeneous mixture and formed into a mat employing a wet-lay process. A high strength paper-like material is formed by thermally bonding the mat under controlled temperature and pressure conditions.

Strength and porous characteristics are imparted to the composite by the combination of polyester fibers employed in the invention. In particular, the strength of the composite can be improved by varying the polyester fiber content in accordance with the following functional relations: (a) as the polyester denier increases at constant length and amount, the porosity, bulk and stiffness of the composite increase and the amount of fiber entanglement decreases; (b) as the polyester length increases at constant denier and amount, the tensile and tear strengths in the MD and CD directions and the Mullen burst strength increase and the stiffness decreases; and (c) as the quantity of polyester increases at constant denier and length, the tensile strength improves, Mullen burst and tear strengths, and porosity increase.

DETAILED DESCRIPTION OF THE PREFERRED EMBODIMENTS

In accordance with the preferred embodiments of the invention, the fiber furnish comprises 5 to 40 wt. % of a first polyester staple fiber having a first denier in the range of 0.2 to 3.0; 0 to 60 wt. % of a second polyester staple fiber having a second denier greater than the first denier, but also in the range of 0.2 to 3.0; 15 to 50 wt. % of a first binder fiber incorporating material having a first melting point which is lower than the melting point of the polyester of the staple fibers; and 1 to 10 wt. % of a second binder fiber incorporating material having a second melting point which is lower than the first melting point.

In accordance with the most preferred embodiment, the fiber furnish consists of 20.4 wt. % 0.43-denier×10 mm polyester staple fibers supplied by Kuraray Co., Ltd., Osaka, Japan (hereinafter "Kuraray") (melting temp. 480° F.); 36.6 wt. % of a bicomponent fiber having a core made of polyester and a sheath made of a co-polyester which melts at a first melting temperature less than the melting temperature of the polyester staple fibers or the melting temperature of the polyester core, namely, 1.0 denier×5 mm EP-101 bicomponent binder fiber supplied by Kuraray (melting temp. 375° F.); 2.3 wt. % of a bicomponent fiber having a core made of polyester and a sheath made of a co-polyester which melts at a second melting temperature less than the first melting temperature, namely, 2.0 denier×5 mm Type N-720H bicomponent binder fiber supplied by Kuraray (melting temp. 225° F.); and 40.7 wt. % 1.5-denier×½" Type 108 polyester staple fibers supplied by Hoechst/Celanese (melting temp. 480° F.). All of the foregoing fiber types are sized by the respective manufacturer.

A high-strength nonwoven material is formed by a wet-laying process on a conventional papermaking machine. Then the nonwoven material is thermally bonded under controlled temperature and pressure conditions. In accordance with the method of the invention, a wet-laid mat of the composite material is dried at temperatures in the range of 200–285° F. and then thermally calendared with rolls heated to temperatures of 425° F. and nip pressures of 50 psi or greater. The weight per unit area of the composite following thermal calendaring can be varied from 25 to 55 pounds per 3000 $ft^2$ depending on the sheet composition and the calendaring conditions chosen to effect a certain set of physical properties.

In accordance with further variations of the invention, the length of the small-denier polyester staple fibers and the lengths of the co-polyester/polyester bicomponent fibers can be varied between 5 and 15 mm, while the length of the large-denier polyester staple fibers can be varied between ⅛" and 1½".

Also, ½"×3.0-denier polyester binder fiber, such as Type 259 supplied by Hoechst Celanese Corporation, Wilmington, Del., may be added or substituted for some of the bicomponent binder fibers.

Figure 1:
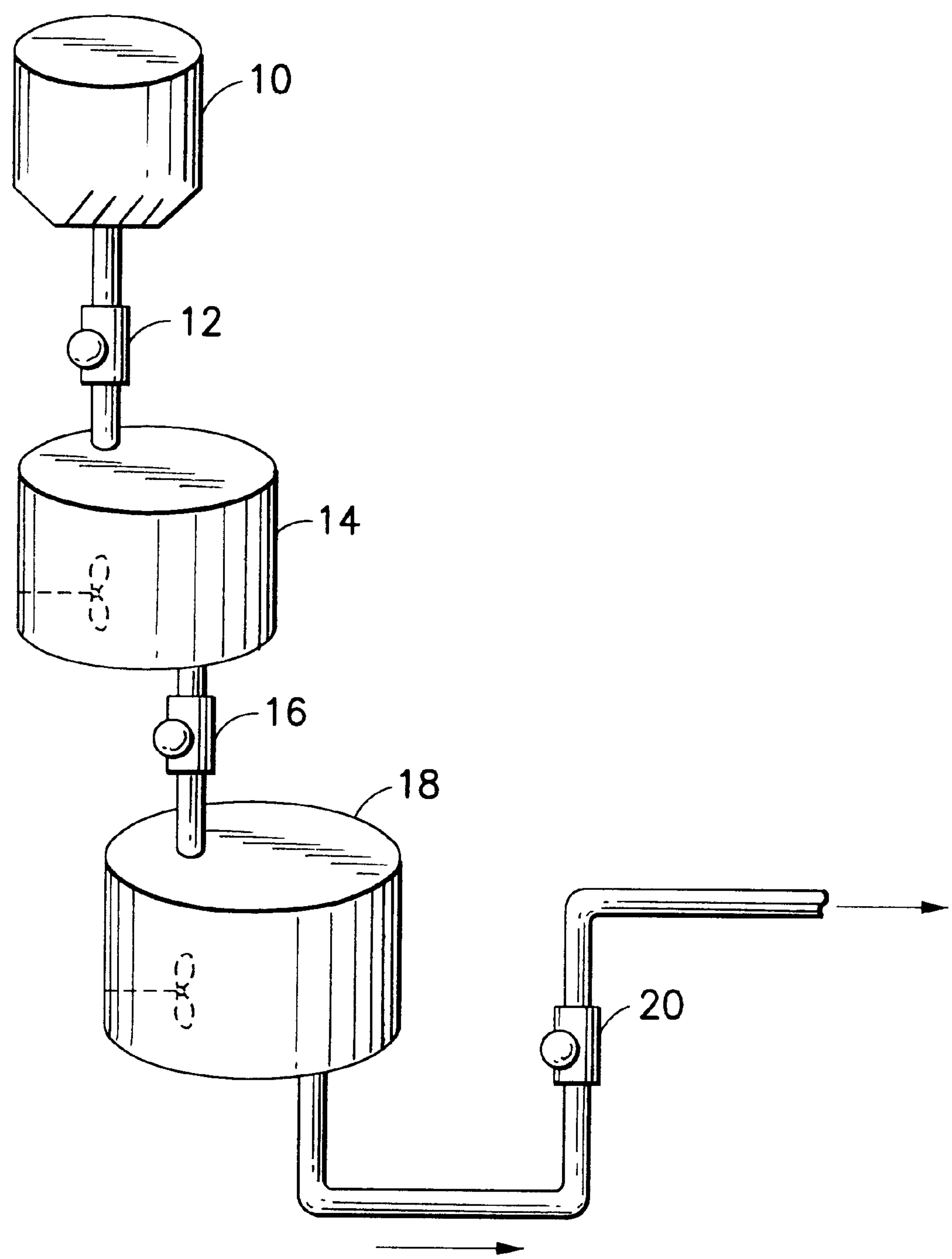
FIG. 1 is a diagrammatic view of an apparatus for preparation of stock or furnish for manufacture of the composite material of the invention.

FIG. 1 illustrates an apparatus for preparation of stock or furnish for manufacture of the composite in accordance with the preferred embodiment. A batch of polyester is prepared in a hydropulper 10, which contains water. In preparation of the slurry, the water is agitated, a surfactant (Pluronic F-108 supplied by BASF Corporation) is added to a concentration of 0.5% based on fiber weight and the polyester staple fibers and co-polyester/polyester bicomponent binder fibers are introduced into the furnish in the following sequence: (1) Kuraray N-720H bicomponent binder fibers; (2) Kuraray EP-101 bicomponent binder fibers; (3) Kuraray 0.43-denier polyester fibers; and (4) Hoechst/Celanese Type 108 polyester fibers. The volume of water and amount of fiber is such that the consistency of the furnish in the hydropulper is about 3% solids. After all of the fibers have been added to the furnish, the furnish is mixed for approximately 3 minutes to disperse the polyester and bicomponent fibers. A web formation aid, e.g., an anionic polyacrylamide, is added to the furnish to a concentration of 1–2% based on fiber weight (Reten 235 supplied by Hercules Inc.). The slurry is mixed for a sufficient time to disperse the polyester fibers in a uniform fashion. Visual inspection is used to determine when the fibers are totally separated and well dispersed. The fiber slurry is then transported to mixing chest 14 via valve 12. In mixing chest 14 the polyester slurry is diluted to the desired consistency, i.e., approximately 1% solids.

After the polyester slurry has been suitably mixed in mixing chest 14, the slurry is transported via opened valve 16 to the machine chest 18, where the slurry is further diluted to a consistency of approximately 0.6% solids. Thereafter, the slurry is transported to the web-forming machine via valve 20.

Figure 2:
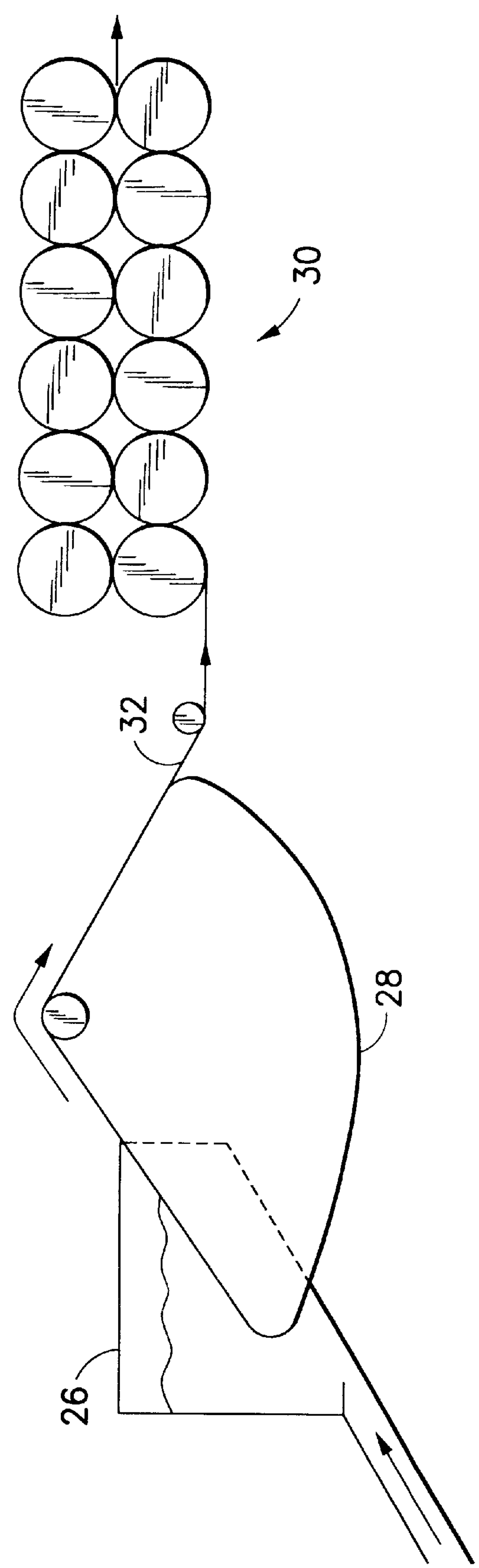
FIG. 2 is a diagrammatic view of an apparatus for formation and drying of a web employed in the manufacture of the composite material.

FIG. 2 is a diagrammatic view of an apparatus for formation and drying of a web employed in the manufacture of the composite in accordance with the invention. The homogeneous fiber slurry is received by headbox 26. In the headbox, the slurry has a consistency of about 0.05% solids. A web 32 is formed by machine 28 using a wet-lay process in accordance with conventional paper-making techniques. The temperature which the fibers are exposed to on the wet-laying machine lies in the range of 325–365° F. During the wet-laying process, the co-polyester sheath materials of the N-720H bicomponent binder fibers (which sheath material has a melting point of 225° F.) melts and then fuses upon cooling to lend strength to the web during further processing. Thereafter, the web 32 enters a stack of drying rollers 30, which remove water from the web. The dried web 32 is then wound up on a reel (not shown in FIG. 2) for further processing.

Figure 3:
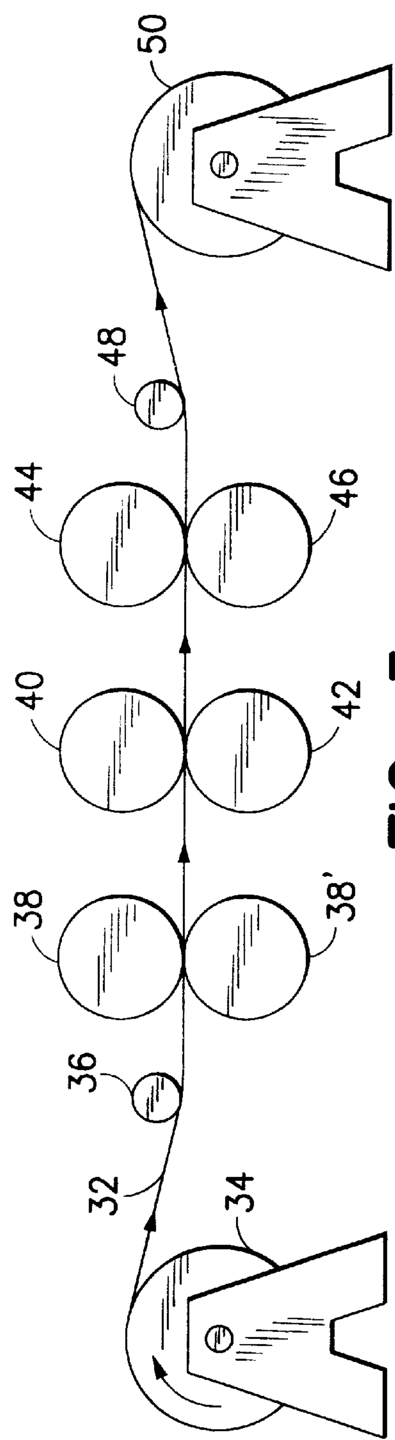
FIG. 3 is a diagrammatic view of an apparatus for thermally bonding the web to form the composite material of the invention.

A high-strength and densified composite material is provided by thermally bonding the dried web 32 in a calendar, as shown in FIG. 3. On the process line, the web 32 is unwound from the reel 34, and fed by guide roll 36 to the nip between calendar rolls 38 and 38'. Calendar rolls 38 and 38', which are preferably fabricated of steel, are heated to a temperature and maintained at a compression pressure in the range of 385–435° F. and of 400–1100 pli. Preferred results are obtained at a temperature of approximately 425° F. and pressure of 800 pli.

Figure 4:
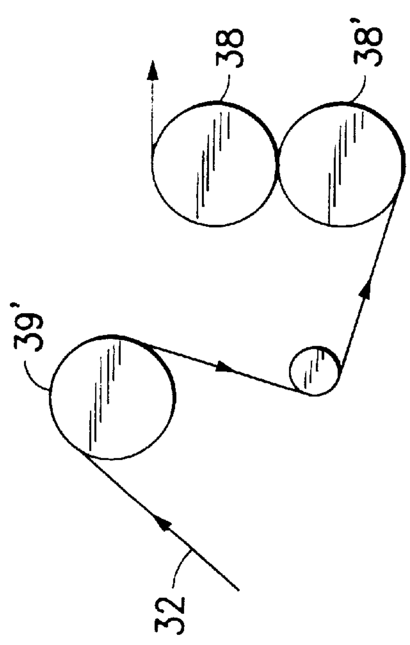
FIG. 4 is a diagrammatic view of an alternative calendar which can be incorporated in the thermal bonding apparatus shown in FIG. 3.

In the alternative, the web can be partially wrapped around a roll 39 which is heated to a temperature of about 385° F. and then passed between the calendar rolls 38 and 38' in an S-configuration, as seen in FIG. 4. The heated roll 39 preheats the web before it enters the calendaring roll nip. Preheating allows a faster speed of the production line.

After thermal bonding in the calendar rolls, the web in succession enters a second nip formed by a soft top roll 40 and a steel bottom roll 42 and a third nip formed by a steel top roll 44 and a soft bottom roll 46. The pressure at the second and third nips is 15 to 35 psi. After passing between rolls 44 and 46, the thermally bonded web contacts guide roll 48 and is then wound up on a reel 50.

Table 1 sets forth physical properties of the preferred embodiment of the invention both before and after thermal bonding.

TABLE 1

| Physical Properties of Composite Material | | | |
|---|---|---|---|
| TAPPI* No. | Physical Property | Uncalendared | Calendared |
| 410 | Basis Weight (3000 ft$^2$) | 46.0 | 46.0 |
| 411 | Caliper (mils) | 22.0 | 4.0 |
| 251 | Porosity-Permeability, Frazier Air (cfm) | 240 | 5–10 |
| 403 | Mullen Burst (psi) | 5 | 136 |
| 414 | Elmendorf Tear (gm) (MD/CD) | 10/15 | 143/155 |
| 494 | Instron Tensile (lb/in.) (MD/CD) | 1.8/1.2 | 35.0/10.0 |
| 494 | Elongation (%) (MD/CD) | 2.4/4.5 | 4.0/5.0 |

TABLE 1-continued

| Physical Properties of Composite Material | | | |
|---|---|---|---|
| TAPPI* No. | Physical Property | Uncalendared | Calendared |

*Standards of the Technical Association of the Pulp and Paper Industry ("TAPPI"), Technology Park, Atlanta, Georgia.

The calendared composite exhibits a microstructure in which fiber interfaces are fused due to melting of the co-polyester sheaths of the EP-101 bicomponent binder fiber. The co-polyester sheath has a melting point lower than that of the polyester core or the polyester staple fibers. The calendaring of the composite web effects a reduction in the fiber spacing, i.e., by fiber compression and bonding. The density of the web material and the flatness (levelness) of the surface of the web material are substantially enhanced in the calendaring process.

The foregoing preferred embodiments have been described for the purpose of illustration only and are not intended to limit the scope of the claims hereinafter. Variations and modifications of the composition and method of manufacture may be devised which are nevertheless within the scope and spirit of the invention as defined in the claims appended hereto. For examples, it will be apparent to practitioners of ordinary skill that binder fibers different than those specified herein may be used, so long as the binder fiber contains thermoplastic material having a melting point lower than that of the polyester fibers and providing adequate bonding of those polyester fibers to form a nonwoven web with high tensile strength. In addition, polyester staple fibers of 0.2 to 3.0 denier can be used and blended in various ratios to effect desired physical properties. The range and blend of bicomponent binder fibers may also be varied to effect desired physical properties. Furthermore, the physical properties as well as the performance of the sheet material can be altered to fit a particular set of physical specifications by adjusting the furnish composition and ratio as well as the calendaring parameters. Sheet basis weights may also vary from 25.0 to 55.0 lb. (3,000 ft$^2$ basis) depending on the sheet fiber composition and the calendaring conditions chosen to effect a certain set of physical properties.

The final sheet material in accordance with the preferred embodiments of the invention is suitable for use as the support substrate in a reverse osmosis membrane. The reverse osmosis membrane is formed by casting a thin film (2–4 mils thick) of polymeric material, preferably polysulfone, on one surface of the nonwoven support substrate in the well-known conventional manner (see, e.g., U.S. Pat. Nos. 4,454,176, 4,728,394 and 5,028,329, the disclosures of which are specifically incorporated by reference herein). It is important that all surface fibers of the nonwoven support substrate be tied down by fused binder material so that the surface fibers do not poke a hole in the polysulfone film. Also the sheet porosity of the nonwoven support substrate should be in the range of 5–10 cfm to ensure that the polysulfone attaches securely to the surface without penetrating deeply into the substrate.

What is claimed is:

1. A nonwoven web comprising: 40 to 84 wt. % of polymeric staple fibers having a length in the range of 5 to 15 mm and a denier in the range of 0.2 to 3.0, said polymeric staple fibers having a melting temperature;

16 to 60 wt. % of polymeric binder fibers comprising a first thermoplastic binder material having a first melting temperature less than said melting temperature of said polymeric staple fibers; and a second thermoplastic binder material having a second melting temperature less than said first melting temperature, wherein said polymeric staple fibers and said first and second thermoplastic binder fibers are substantially homogeneously mixed so that said polymeric staple fibers are bonded to form the nonwoven web by said first and second thermoplastic binder materials, and the nonwoven web has a permeability of 5 to 10 cfm, wherein said staple fibers comprise a first fraction of staple fibers having a denier greater than 0.2 but less than 1.0 and a second fraction of staple fibers having a denier greater than 1.0 but less than 3.0.

2. The nonwoven web as defined in claim 1, wherein said polymeric staple fibers are made of polyester.

3. The nonwoven web as defined in claim 1, wherein said first thermoplastic binder material is a co-polyester.

4. The nonwoven web as defined in claim 1, wherein said first thermoplastic binder material is co-polyester from a first fraction of co-polyester/polyester bicomponent fibers.

5. The nonwoven web as defined in claim 1, comprising 5 to 40 wt. % of said polyester staple fibers of said first fraction and 0 to 60 wt. % of said polyester staple fibers of said second fraction.

6. The nonwoven web as defined in claim 4, wherein said co-polyester/polyester bicomponent fibers of said first fraction have a co-polyester sheath material which melts at said first melting temperature.

7. The nonwoven web as defined in claim 6, wherein said homogeneously mixed fibers comprise 15 to 50 wt. % of said co-polyester/polyester bicomponent fibers of said first fraction and 1 to 10 wt. % of said co-polyester/polyester bicomponent fibers of a second fraction.

8. A nonwoven web made from a furnish comprising:

5 to 40 wt. % of polymer staple fibers having a denier greater than 0.2 but less than 1.0;

0 to 60 wt. % of polymer staple fibers having a denier greater than 1.0 but less than 3.0;

15 to 50 wt. % of co-polymer/polymer bicomponent fibers having co-polymer sheath material which melts at a first melting temperature less than the melting temperature of said polymeric staple fibers; and 1 to 10 wt. % of co-polymer/polymer bicomponent fibers having co-polymer sheath material which melts at a second melting temperature less than the first melting temperature, wherein said polymer staple fibers and said bicomponent fibers are substantially homogeneously mixed so that said polymer staple fibers are bonded to form the nonwoven web at least in part by solidification of said co-polymer sheath material after subjecting said fibers to temperatures in excess of said first melting temperature, but not in excess of the melting temperature of said polymer staple fibers, and the thermally bonded nonwoven web has a permeability of 5 to 10 cfm.

9. The nonwoven web as defined in claim 8, wherein said polymeric staple fibers are made of polyester.

10. The nonwoven web as defined in claim 8, wherein said co-polymer sheath material is co-polyester.

11. The nonwoven web as defined in claim 8, wherein said co-polymer/polymer bicomponent fibers comprise co-polyester/polyester bicomponent fibers.

* * * * *